United States Patent
Tran

(10) Patent No.: US 11,282,209 B2
(45) Date of Patent: Mar. 22, 2022

(54) SYSTEM AND METHOD FOR GENERATING CONTOURS

(71) Applicant: RAYTHEON COMPANY, Waltham, MA (US)

(72) Inventor: Tuan T. Tran, Plano, TX (US)

(73) Assignee: Raytheon Company, Waltham, MA (US)

( * ) Notice: Subject to any disclaimer, the term of this patent is extended or adjusted under 35 U.S.C. 154(b) by 135 days.

(21) Appl. No.: 16/740,186

(22) Filed: Jan. 10, 2020

(65) Prior Publication Data

US 2021/0217176 A1 Jul. 15, 2021

(51) Int. Cl.
*G06T 7/12* (2017.01)
*G06T 7/136* (2017.01)

(52) U.S. Cl.
CPC .............. *G06T 7/12* (2017.01); *G06T 7/136* (2017.01); *G06T 2207/10081* (2013.01); *G06T 2207/10088* (2013.01)

(58) Field of Classification Search
CPC .................................. G06T 7/12; G06T 7/136
See application file for complete search history.

(56) References Cited

U.S. PATENT DOCUMENTS

| | | | |
|---|---|---|---|
| 5,425,368 A | 6/1995 | Brandt | |
| 5,572,565 A * | 11/1996 | Abdel-Mottaleb | ... G06T 7/0012 378/37 |
| 5,956,421 A * | 9/1999 | Tanaka | ..................... G06T 7/136 382/172 |
| 6,111,975 A | 8/2000 | Sacks et al. | |
| 6,333,788 B1 * | 12/2001 | Yamada | .................... G06K 9/38 358/1.15 |
| 6,366,797 B1 | 4/2002 | Fisher et al. | |
| 6,760,611 B1 | 7/2004 | Watanabe | |
| 7,046,831 B2 | 5/2006 | Ruchala et al. | |
| 7,298,898 B2 * | 11/2007 | Haque | ....................... G06T 7/11 382/168 |
| 8,265,357 B2 | 9/2012 | Ramsing et al. | |
| 10,102,682 B1 | 10/2018 | Samaniego et al. | |
| 10,706,539 B2 | 7/2020 | Samaniego et al. | |

(Continued)

FOREIGN PATENT DOCUMENTS

| | | |
|---|---|---|
| DE | 10 2010 041 619 A1 | 3/2012 |
| JP | 2004-312434 A | 11/2004 |
| TW | 201123076 A1 | 7/2011 |

OTHER PUBLICATIONS

H. Sun et al., "An improved OTSU's method for CT image boundary contour extraction," 2016 IEEE International Conference on Imaging Systems and Techniques (IST), 2016, pp. 493-497, doi: 10.1109/IST.2016.7738276. (Year: 2016).*

(Continued)

*Primary Examiner* — Gandhi Thirugnanam
(74) *Attorney, Agent, or Firm* — Lewis Roca Rothgerber Christie LLP

(57) ABSTRACT

A system and method for generating contours in medical imaging scans. In some embodiments, the method includes calculating a first threshold, based on a first target point in a normalized scan data array, and generating a first contour. The contour may be a boundary of a first region, the first region being a region within which the elements of the normalized scan data array are less than the first threshold.

18 Claims, 10 Drawing Sheets

(56) References Cited

U.S. PATENT DOCUMENTS

| | | | |
|---|---|---|---|
| 2002/0136439 | A1 | 9/2002 | Ruchala et al. |
| 2003/0063802 | A1* | 4/2003 | Li .............................. G06T 7/11 |
| | | | 382/199 |
| 2003/0081836 | A1* | 5/2003 | Averbuch ................ G06T 7/215 |
| | | | 382/199 |
| 2004/0102905 | A1 | 5/2004 | Adorjan et al. |
| 2005/0232474 | A1 | 10/2005 | Wei et al. |
| 2006/0232608 | A1 | 10/2006 | Riaz |
| 2007/0047793 | A1* | 3/2007 | Wu ........................... G06T 5/10 |
| | | | 382/132 |
| 2007/0122033 | A1* | 5/2007 | Hu ............................ G06T 7/11 |
| | | | 382/171 |
| 2008/0026385 | A1 | 1/2008 | Sharma et al. |
| 2009/0129653 | A1 | 5/2009 | DeHority et al. |
| 2010/0246922 | A1 | 9/2010 | Uchihara et al. |
| 2011/0081062 | A1* | 4/2011 | Li ........................... G06T 5/002 |
| | | | 382/131 |
| 2011/0135173 | A1 | 6/2011 | Elbaroudi et al. |
| 2011/0150309 | A1 | 6/2011 | Barfett et al. |
| 2012/0033862 | A1* | 2/2012 | Wang ....................... G06T 7/187 |
| | | | 382/128 |
| 2012/0038644 | A1 | 2/2012 | Jones et al. |
| 2012/0207270 | A1 | 8/2012 | Flohr et al. |
| 2012/0212598 | A1 | 8/2012 | Mowrey et al. |
| 2013/0051676 | A1 | 2/2013 | Wehnes et al. |
| 2014/0016832 | A1* | 1/2014 | Kong .................... A61B 5/1128 |
| | | | 382/115 |
| 2014/0315732 | A1 | 10/2014 | Lobe |
| 2015/0004717 | A1 | 1/2015 | McDevitt et al. |
| 2015/0262359 | A1 | 9/2015 | Fujiwara et al. |
| 2015/0339809 | A1 | 11/2015 | Ohishi |
| 2015/0348259 | A1* | 12/2015 | Souza ...................... G06T 7/187 |
| | | | 382/131 |
| 2016/0055632 | A1 | 2/2016 | Fu et al. |
| 2016/0080548 | A1 | 3/2016 | Erickson et al. |
| 2017/0071562 | A1 | 3/2017 | Suzuki |
| 2018/0000441 | A1* | 1/2018 | Wang ...................... A61B 6/504 |
| 2018/0278868 | A1 | 9/2018 | Dawson et al. |
| 2019/0163950 | A1* | 5/2019 | Zhang ...................... G06T 7/194 |
| 2019/0172205 | A1 | 6/2019 | Mao et al. |
| 2020/0394796 | A1* | 12/2020 | Song ....................... G06T 7/0012 |
| 2021/0042998 | A1 | 2/2021 | Samaniego |
| 2021/0217176 | A1* | 7/2021 | Tran ........................... G06T 7/12 |

OTHER PUBLICATIONS

Anonymous: "matlab—Extracting image region within boundary—Stack Overflow" retrieved from the Internet: URL:https://stackoverflow.com/questions/9442932/extracting-image-region-within-bounbdary, Mar. 2, 2012 (7 pgs.).

Anonymous: "Segmenting a cube in image by following the Coin segmentation tutorial. How to sort the blobs in a fixed order?—MATLAB Answers—MATLAB Central", retrieved from the Internet: URL:https://de.matworks.com/matlabcentral/answers/251547-segmenting-a-cube-in-image-by-following-the-coin-segmentation-tutorial-how-to-sort-the-blobs-in-a-f, Nov. 1, 2015 (8 pgs.).

Otsu N, "A Threshold Selection Method from Gray-Level Histograms", IEEE Transactions on Systems, Man and Cybernetics, IEEE Inc., vol. 9, No. 1, Jan. 1, 1979 (pp. 62-66).

Anonymous: "Region Growing problem with ginput—MATLAB Answers—MATLAB Central", retrieved from the Internet: URL:https://de.mathworks.com/matlabcentral/answers/82743-region-growing-problem-with-ginput, Nov. 6, 2017 (7 pgs.).

Anonymous: "How can i segment a color image with region growing?—MATLAB Answers—MATLAB Central", retrieved from the Internet: URL:https://de.mathworks.com/matlabcentral/answers/53351-how-can-i-segment-a-color-image-with-region-growing, Nov. 2, 2017 (5 pgs.).

Storyblocks: "Photoshop Basics: How to Use the Magic Wand Tool", retrieved from the Internet: URL:https://www.youtube.com/watch?v=cwh4CbsFxIA [retrieved on Mar. 5, 2021] frames at instant 0:34, 0:40 and 0:42, Nov. 24, 2015 (2 pgs.).

International Search Report for corresponding International Application No. PCT/US2020/052566, filed Sep. 24, 2020, International Search Report dated Mar. 5, 2021 and dated Mar. 16, 2021 (4 pgs.).

Written Opinion of the International Searching Authority for corresponding International Application No. PCT/US2020/052566, filed Sep. 24, 2020, Written Opinion of the International Searching Authority dated Mar. 16, 2021 (6 pgs.).

Kauanova, Sholpan et al., "Automated image segmentation for detecting cell spreading for metastasizing assessments of cancer development", Jan. 1, 2018.

Simon, Inpakala et al., "Automated Image Analysis System for Detecting Boundaries of Live Prostate Cancer Cells", Cytometry, 1998, pp. 287-294, Wiley-Liss, Inc.

Younes, R. Ben et al., "A fully automated contour detection algorithm the preliminary step for scatter and attenuation compensation in SPECT", European Journal of Nuclear Medicine, 1988, pp. 586-589, Springer-Verlag.

Badakhshannoory, et al., "A Model-Based Validation Scheme for Organ Segmentation in CT Scan Volumes", IEEE Transactions on Biomedical Engineering, vol. 58, No. 9 Sep. 1, 2011 (pp. 2681-2693).

Cai, Jinzheng et al., "Pancreas Segmentation in CT and MRI Images via Domain Specific Network Designing and Recurrent Neural Contextual Learning", Mar. 30, 2018, pp. 1-11, arXiv:1803.11303v1.

Cai, Jinzheng et al., "Pancreas Segmentation in MRI Using Graph-Based Decision Fusion on Convolutional Neural Networks", 2016, pp. 442-450, Springer International Publishing AG.

European Patent Office Communication pursuant to Rules 161(1) and 162 EPC, dated Nov. 26, 2019, for Patent Application No. EP18706015.7, 3 pages.

Fishman, Elliot K. et al., "Volume Rendering versus Maximum Intensity Projection in CT Angiography: What Works Best, When, and Why", RadioGraphics, May-Jun. 2006, pp. 905-922, vol. 26, No. 3, RSNA.

International Search Report and Written Opinion of the International Searching Authority, dated Apr. 24, 2018, corresponding to PCT/US2018/015693, 12 pages.

International Search Report for corresponding International Application No. PCT/US2020/040319, filed Jun. 30, 2020, International Search Report dated Aug. 12, 2020 and dated Aug. 28, 2020 (5 pgs.).

International Search Report for corresponding International Application No. PCT/US2018/046564, filed Aug. 13, 2018, International Search Report dated Oct. 18, 2018 and dated Oct. 25, 2018 (5 pgs.).

Kitano, S. et al., "Quantitative CT color mapping of the arterial enhancement fraction of the liver: A useful tool for the diagnosis of local hepatocellular carcinoma recurrences after TACE?", ECR, 2010, pp. 1-17, Poster No. C-0043, European Society of Radiology.

Mindek, Peter, "Maximum Intensity Projection Weighted by Statistical Cues", Proceedings of CESCG 2011, http://old.cescg.org/CESCG-2011/papers/TUBratislava-Mindek-Peter.pdf, retrieved Apr. 17, 2018, 7 pages.

Partial English translation of the Taiwanese Notice of Allowance, for Patent Application No. 107103473, dated Jul. 23, 2019, 1 page.

Persson, A. et al., "Standardized vol. Rendering for Magnetic Resonance Angiography Measurements in the Abdominal Aorta", Acta Radiologica, 2006, pp. 172-178, Taylor & Francis.

Taiwanese Notice of Allowance, for Patent Application No. 107103473, dated Jul. 23, 2019, 3 pages.

Unpublished U.S. Appl. No. 16/683,159, filed Nov. 13, 2019.
Unpublished U.S. Appl. No. 17/116,878, filed Dec. 9, 2020.
Unpublished U.S. Appl. No. 17/116,964, filed Dec. 9, 2020.

Written Opinion of the International Searching Authority for corresponding International Application No. PCT/US2020/040319, filed Jun. 30, 2020, Written Opinion of the International Searching Authority dated Aug. 28, 2020 (10 pgs.).

Written Opinion of the International Searching Authority for corresponding International Application No. PCT/US2018/046564,

(56) References Cited

OTHER PUBLICATIONS filed Aug. 13, 2018, Written Opinion of the International Searching Authority dated Oct. 25, 2018 (9 pgs.).

\* cited by examiner

SYSTEM AND METHOD FOR GENERATING CONTOURS

FIELD

One or more aspects of embodiments according to the present invention relate to medical imaging, and more particularly to a system and method for drawing contours in medical imaging scans.

BACKGROUND

Medical imaging scans, such as magnetic resonance imaging (MRI) scans and computerized axial tomography (CT or CAT) scans are procedures that may be used to obtain information about the internal structure of an object, such as a patient.

In a medical imaging scan, a cancerous portion of an organ may have a different density than surrounding healthy tissue. It may be useful to determine a contour corresponding to the boundary between cancerous tissue and healthy tissue, so that, for example, the volume of a cancerous region may be estimated.

Drawing such a contour manually, e.g., by a radiologist operating a computer, may be time-consuming and imprecise, and the repeatability of such a method may be poor. Thus, there is a need for an improved system and method for generating contours in medical imaging scans.

SUMMARY

According to an embodiment of the present invention, there is provided a method, including: calculating a first threshold, based on a first target point in a normalized scan data array; and generating a first contour, the first contour being a boundary of a first region, the first region being a region within which the elements of the normalized scan data array are less than the first threshold.

In some embodiments, the calculating of the first threshold includes calculating a statistic of a first portion of the normalized scan data array, the first portion being within a first threshold-finding rectangle and within a global mask.

In some embodiments, the statistic of the first portion of the normalized scan data array is the mean of the first portion of the normalized scan data array.

In some embodiments, the method further includes calculating the global mask by: setting to 1 each element of the global mask corresponding to an element of the normalized scan data array exceeding a global mask threshold; and setting to 0 each element of the global mask corresponding to an element of the normalized scan data array not exceeding the global mask threshold.

In some embodiments, the method further includes generating the global mask threshold, based on the normalized scan data array, using Otsu's algorithm.

In some embodiments, the first region further is a region within a first search area, the first search area being a first rectangle.

In some embodiments, the first region is the largest region of one or more regions within which the elements of the normalized scan data array are less than the first threshold.

In some embodiments, the method further includes: calculating a second threshold, based on the first target point, the second threshold being greater than the first threshold; and generating a second contour in the normalized scan data array, the second contour being a boundary of a second region, the second region being a region within which the elements of the normalized scan data array are less than the second threshold.

In some embodiments, the calculating of the second threshold includes calculating a statistic of a second portion of the normalized scan data array, the second portion being within a second threshold-finding rectangle and within a global mask.

In some embodiments, the statistic of the second portion of the normalized scan data array is the mean of the second portion of the normalized scan data array.

In some embodiments, the second threshold-finding rectangle is at least as large as a smallest rectangle including the one or more regions within which the elements of the normalized scan data array are less than the first threshold.

In some embodiments: the second region further is a region within a second search area, the second search area is a second rectangle, and the second rectangle contains the second threshold-finding rectangle.

In some embodiments, the second region is the largest region of one or more regions within which the elements of the normalized scan data array are less than the second threshold.

According to an embodiment of the present invention, there is provided a system including: a processing circuit, and a non-transitory memory, the non-transitory memory storing instructions that, when executed by the processing circuit, cause the processing circuit to: calculate a first threshold, based on a first target point in a normalized scan data array; and generate a first contour, the first contour being a boundary of a first region, the first region being a region within which the elements of the normalized scan data array are less than the first threshold.

In some embodiments, the calculating of the first threshold includes calculating a statistic of a first portion of the normalized scan data array, the first portion being within a first threshold-finding rectangle and within a global mask.

In some embodiments, the statistic of the first portion of the normalized scan data array is the mean of the first portion of the normalized scan data array.

In some embodiments, the instructions further cause the processing circuit to generate the global mask by: setting to 1 each element of the global mask corresponding to an element of the normalized scan data array exceeding a global mask threshold; and setting to 0 each element of the global mask corresponding to an element of the normalized scan data array not exceeding the global mask threshold.

In some embodiments, the instructions further cause the processing circuit to calculate the global mask threshold, based on the normalized scan data array, using Otsu's algorithm.

In some embodiments, the first region further is a region within a first search area, the first search area being a first rectangle.

In some embodiments, the first region is the largest region of one or more regions within which the elements of the normalized scan data array are less than the first threshold.

BRIEF DESCRIPTION OF THE DRAWINGS

Features, aspects, and embodiments are described in conjunction with the attached drawings, in which.

DETAILED DESCRIPTION

Figure 1:
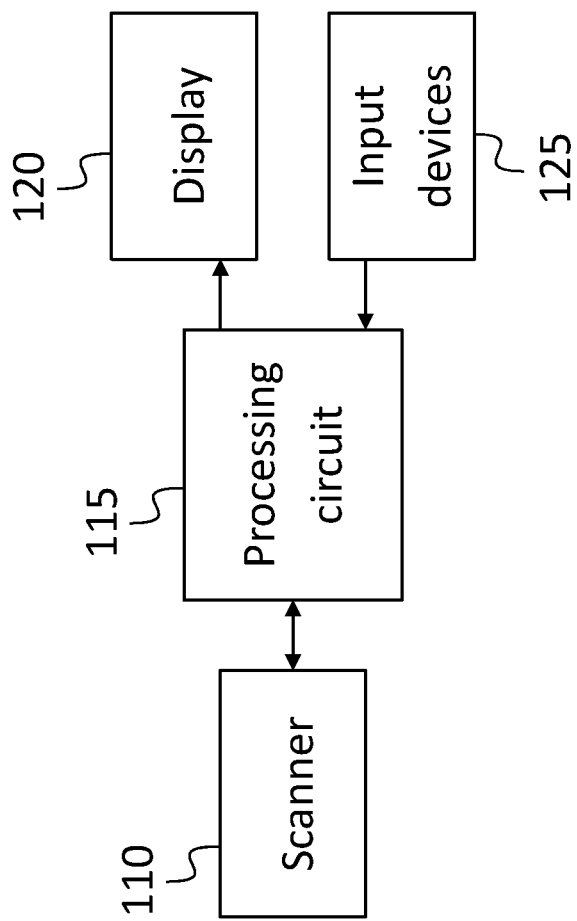
FIG. 1 is a system for generating images of the interior of an object, according to an embodiment of the present invention.

The detailed description set forth below in connection with the appended drawings is intended as a description of exemplary embodiments of a system and method for generating contours in medical imaging scans provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the scope of the invention. As denoted elsewhere herein, like element numbers are intended to indicate like elements or features.

A computerized axial tomography (CAT) scan is a procedure in which an object (e.g., a patient) is illuminated from several directions with penetrating (e.g., X-ray) radiation from a radiation source, and a scan image of the transmitted radiation is formed, in each instance, by a detector, to form a plurality of scan images, each of which may be represented as a two-dimensional array. The radiation may be attenuated at different rates in different kinds of matter; accordingly, each point in each image may correspond to a transmitted radiant intensity depending on the attenuation rates of the compositions of matter on the path along which the radiation traveled from the radiation source to the detector. From the combination of scan images, raw scan data, e.g., a three-dimensional model of the "density" of the object may be formed. As used herein, the "density" within an object is any characteristic that varies within the object and that is measured by the medical imaging scan. For example, with respect to CAT scans, the "density" may refer to the local rate of attenuation of the penetrating radiation and with respect to MRI scans, the "density" may refer to the density of atoms having a nuclear resonance at the frequency of the probe radio frequency signal, in the presence of the magnetic field being applied. Although some examples are discussed in the present disclosure in the context of CAT scans or MRI scans of a human patient, the invention is not limited thereto, and in some embodiments other kinds of scans providing three-dimensional density data such as magnetic resonance imaging scans or positron emission tomography scans, or scans of objects other than human patients may be processed in an analogous fashion. In the case of other kinds of scans, density may be defined accordingly; in the case of a positron emission tomography scan, for example, the density may be the density of nuclei that decay by beta plus emission. As used herein, the term "object" includes anything that may be scanned, and encompasses without limitation human patients, animals, plants, inanimate objects, and combinations thereof.

When the object being imaged is a human patient (or other living object), a contrast agent may be used (e.g., injected into or ingested by the patient) to selectively alter the density of some tissues. The contrast agent may for example include a relatively opaque substance (i.e., relatively opaque to the penetrating radiation). The density of tissue containing the contrast agent may be increased as a result, and it may be increased to an extent that depends on the concentration of contrast agent in the tissue.

FIG. 1 shows a block diagram of a system for performing a scan and processing and displaying the results, according to one embodiment. The system includes a scanner 110, a processing circuit 115 (described in further detail below), a display 120 for displaying images, or sequences of images in the form of a movie (or "video"), and one or more input devices 125 such as a keyboard or mouse, that an operator (e.g., a radiologist) may use to operate the system, and to set parameters affecting the processing of the images to be displayed. It should be noted that the processing circuit 115, the display 120, and the input devices 125 may be part of a unitary system or may be a distributed system with the processing circuit 115, for example, being separate and communicatively coupled to the display 120 and input devices 125. In some embodiments, servers store the images and clients request and receive the images from the servers, with image processing performed on the server or on the client, or both.

A plurality of scans may be performed, and analyzed together. For example, a first scan of an object (e.g., a patient) may be performed before the contrast agent is injected, and several subsequent scans of the object may be performed at various times (e.g., at regular intervals) after injection of the contrast agent, as the concentration of contrast agent changes. The rate at which the concentration of contrast agent increases initially, the peak concentration reached, and the rate at which the concentration of contrast agent subsequently decreases all may depend on the type of tissue into which the contrast is injected or which is of interest.

Figure 2:
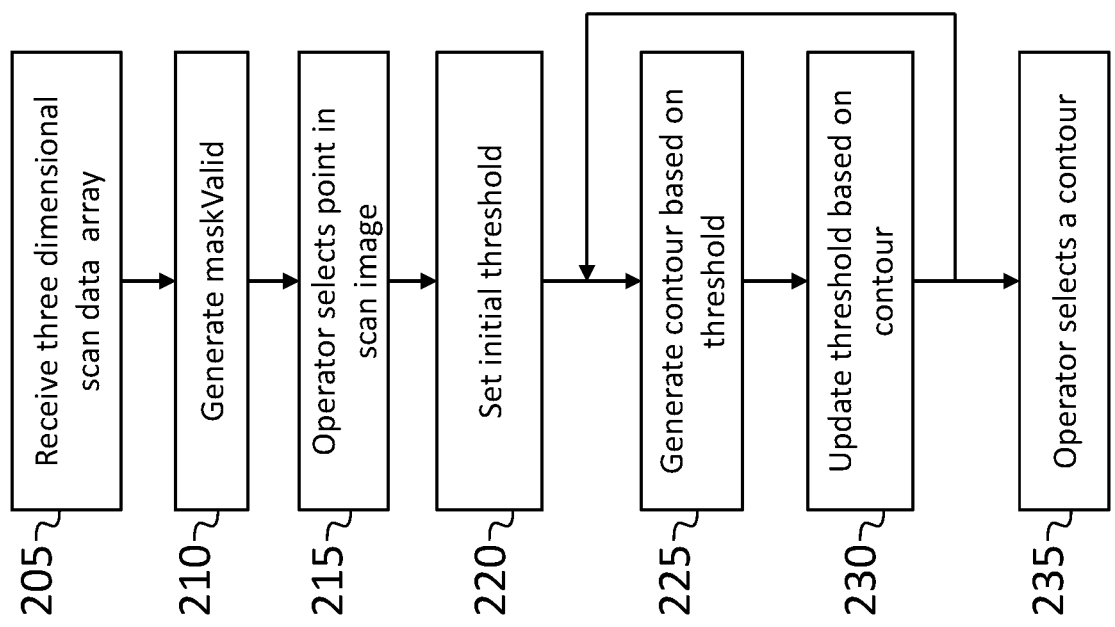
FIG. 2 is a flow chart of a method for generating contours in medical imaging scans, according to an embodiment of the present invention.

In some embodiments, various methods may be employed to generate and display contours, annotations, and other data, generated from medical imaging scan data, to aid in the use of a medical imaging scan as a diagnostic tool. A sequence of steps, or "acts" illustrated in FIG. 2 and discussed in further detail below may be used, for example, to generate a plurality of contours, which may then be displayed on the image, and one or more of which may be used to generate statistics. The statistics may also be displayed on the image or, e.g., in a separate graph (e.g., FIG. 4). Referring to FIG. 2, in an act 205, a three-dimensional scan data array is received. The three-dimensional scan data array may be a raw data array (e.g., an array of density values for each of a three-dimensional array of voxels) or it may be a processed data array, e.g., a difference between two raw data arrays from among a sequence of raw data arrays obtained at different times before or after the injection of a contrast agent. In an act 210, a global mask is formed from a reference slice of the three-dimensional scan data array. In an act 215, an operator (e.g., a radiologist) selects a point in an image of the reference slice. Each iteration of the loop including acts 225 and 230 then generates a new contour. For example, a first threshold is used to define a region of the reference slice, and the boundary of the region forms a first contour. The first contour and other contours also based on the first threshold may then be used to define an area from which a second threshold is calculated, and the second threshold is used to form a second contour. In some embodiments, the second threshold is greater than the first threshold, and the contour corresponding to the second threshold is larger than the contour corresponding to the first threshold. This process may be repeated multiple times. An operator may then, at 235, select a preferred one of the multiple contours produced by the loop including acts 225 and 230.

The steps of FIG. 2 can be further understood via the code listed in Listing 1, which shows MATLAB™ code for generating contours in medical imaging scans. On lines 5-28 of Listing 1 (and at 205 in FIG. 2), a three-dimensional scan data array is read in from a data file (an MRI data file or a CT scan data file) and a slice (or "reference slice") is selected and assigned to the (two dimensional) scan data array f. The scan data array f is normalized and assigned to f2 (the normalized scan data array) on line 30 of Listing 1. On line 49 of Listing 1 (and at 210 in FIG. 2), a global mask, maskValid, is formed, using the imbinarize function. This function may (i) set to 1 each element of the global mask corresponding to an element of the normalized scan data array exceeding a global mask threshold, and (ii) set to 0 each element of the global mask corresponding to an element of the normalized scan data array not exceeding the global mask threshold. The global mask threshold may be calculated from the normalized scan data array using Otsu's algorithm, described in Otsu, N., "A Threshold Selection Method from Gray-Level Histograms." IEEE Transactions on Systems, Man, and Cybernetics. Vol. 9, No. 1, 1979, pp. 62-66, which is incorporated herein by reference. The effect of generating the global mask in this manner may be to generate a mask that is zero outside of the object (e.g., the patient) being scanned and nonzero inside the object being scanned.

Figure 3A:
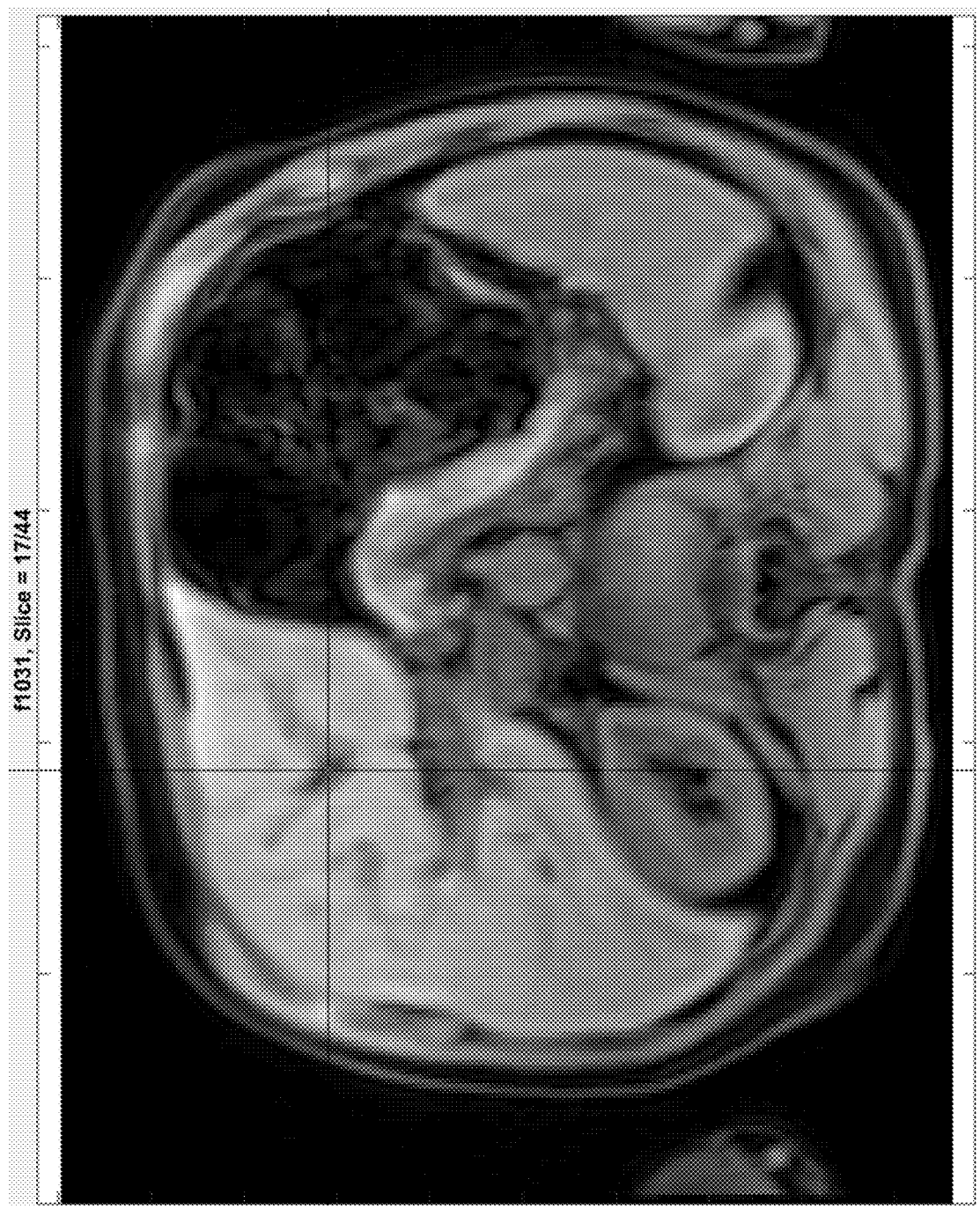
FIG. 3A is an image of a slice of a medical imaging scan, according to an embodiment of the present invention.

Lines 52-169 of Listing 1 are a loop that may be executed repeatedly, each time for a different point, or "target point" (or "mark point") in the slice, which is selected at line 54 of Listing 1 (and at 215 in FIG. 2) by an operator (e.g., a radiologist), e.g., by performing a mouse click over a pixel, in the normalized scan data array (displayed by line 31 of Listing 1), that the operator believes is in a cancerous region of the normalized scan data array. FIG. 3A illustrates an interface for selecting a target point. Lines 66-134 of Listing 1 are a loop each iteration of which creates, as discussed in further detail below, a new contour for the current target point, so that a plurality of contours may be created for each target point.

On lines 70 and 71 of Listing 1, a rectangle (or "first threshold-finding rectangle") is defined (as an array of consecutive integers xIdx defining a range of x-coordinates, and an array of consecutive integers yIdx defining a range of y-coordinates). This threshold-finding rectangle is used, on lines 73-75 of Listing 1, to find a first threshold, by calculating a statistic (e.g., the mean on line 74 of Listing 1) of the portion of the normalized scan data array that is (i) within the first threshold-finding rectangle and (ii) within the global mask (i.e., within the portion of the global mask in which the values are one). In some embodiments, a different statistic (e.g., the median, the mode, or the maximum) is used. In FIG. 2, act 220 corresponds to the execution of line 75 of Listing 1 during the first iteration of the loop extending from line 66 to line 134 of Listing 1.

The first threshold is used, at lines 81-90 of Listing 1 (and at 225 in FIG. 2), to generate a set of contours. Each of the contours is (as a result of the call to bwboundaries( ) on line 90 of Listing 1) the boundary of a region (referred to as a "blob" in variable names and comments in Listing 1) that is (i) within a search area, and (ii) within which the masked scan data array f6 (which is the argument of the call to bwboundaries( ) is nonzero. The search area is defined, on lines 77-80 of Listing 1, as an array of consecutive integers xIdxSearch defining a range of x-coordinates, and an array of consecutive integers yIdxSearch defining a range of y-coordinates; this rectangular array is used on line 85 of Listing 1, to form a mask (mask0), which is used at line 86 of Listing 1 to eliminate any regions, or portions of regions, that are not within the search area.

The first threshold, detThrs, is used on line 81 of Listing 1 to generate a mask f3 that may include one or more regions (within which the elements of the mask f3 are set to one) within which the elements of the normalized scan data array are less than the first threshold (or, for subsequent iterations of the loop extending from line 66 to line 134 of Listing 1, the second threshold, the third threshold, and so forth). This approach may be suitable for circumstances in which an operator (e.g., a radiologist) seeks to identify a contour of a low-density region (e.g., a region affected by a type of cancer that reduces the density of affected tissue). In other circumstances, an operator may instead seek to identify a contour of a high-density region; in such a circumstance, code that determines a region within which the elements of the normalized scan data array are greater than a threshold (e.g., the first threshold, the second threshold, etc.) may be used (instead of the code on line 81 of Listing 1).

Some of the boundaries may be inside other boundaries (e.g., if one of the regions is not simply connected, i.e., has a "hole" in it). Lines 99-121 of Listing 1 are a for loop that iterates over all of the regions and over the corresponding boundaries defined on line 90 of Listing 1. Lines 103-106 save, for the largest region containing the target point, in the variables kSelect, x2, and y2, the index, the range of x values within the region (defined for each region on line 101 of Listing 1), and the range of y values within the region (defined for each region on line 101 of Listing 1), respectively. The largest region may be used so that, for example, for a region having an outer boundary and an inner boundary around a hole in the region, the outer boundary is used if the target point is within both the outer boundary and the boundary of the hole.

Lines 110 and 111 of Listing 1 define a rectangle (by the four values xMin, xMax, yMin, and yMax) into which all of the boundaries fit. This rectangle is then used as a starting rectangle when the threshold-finding rectangle is updated (on lines 70 and 71 of Listing 1) for the next iteration of the loop extending from line 52 to line 169 of Listing 1.

If the target point is not within any of the boundaries, then the code at lines 113-121 of Listing 1 may have the effect of selecting the boundary with the greatest area, and saving, for this greatest area, in the variables kSelect, x2, and y2, the index, the range of x values within the boundary (defined for each region on line 101 of Listing 1), and the range of y values within the boundary (defined for each region on line 101 of Listing 1), respectively.

Figure 3B:
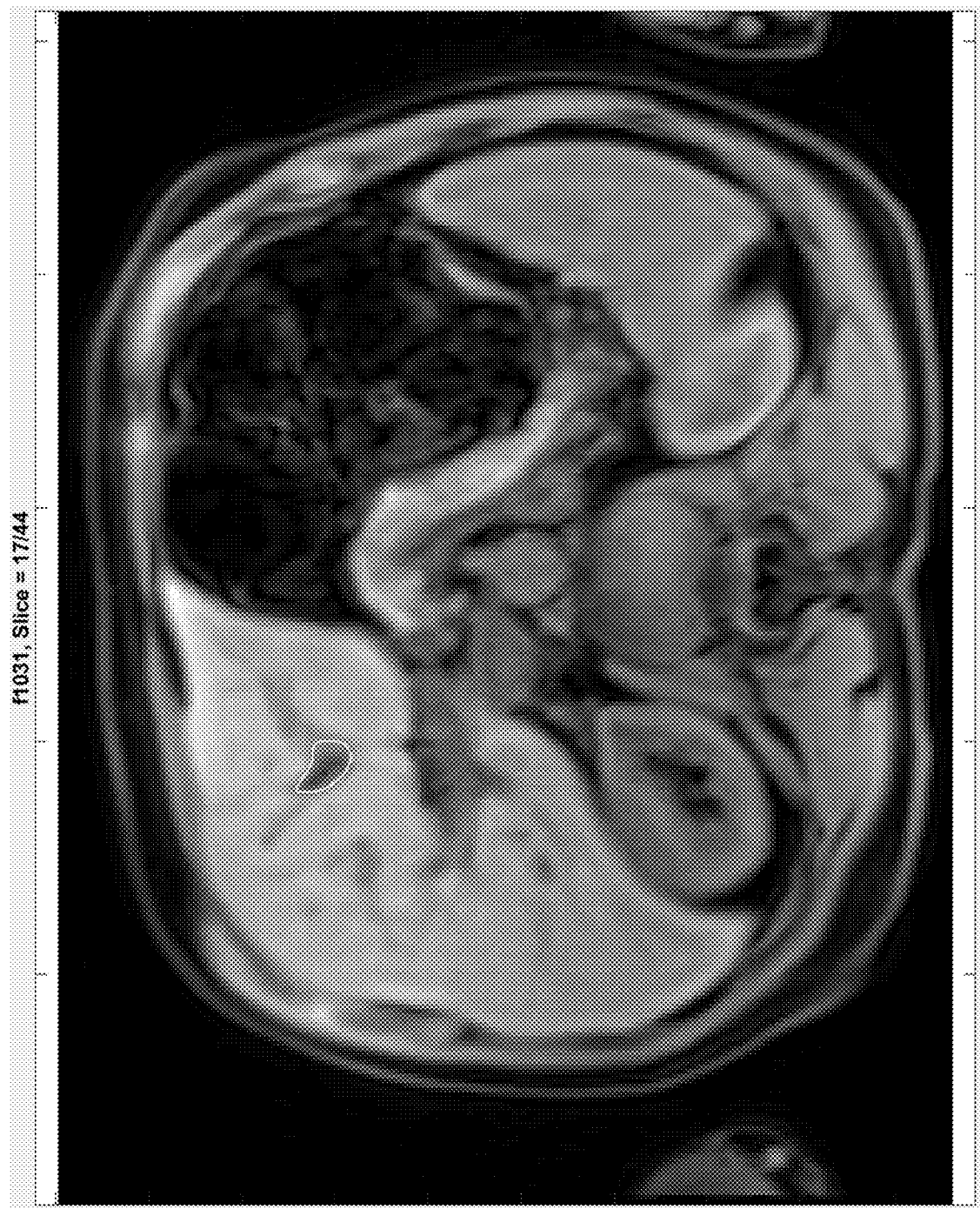
FIG. 3B is an image of a slice of a medical imaging scan, according to an embodiment of the present invention.
Figure 3C:
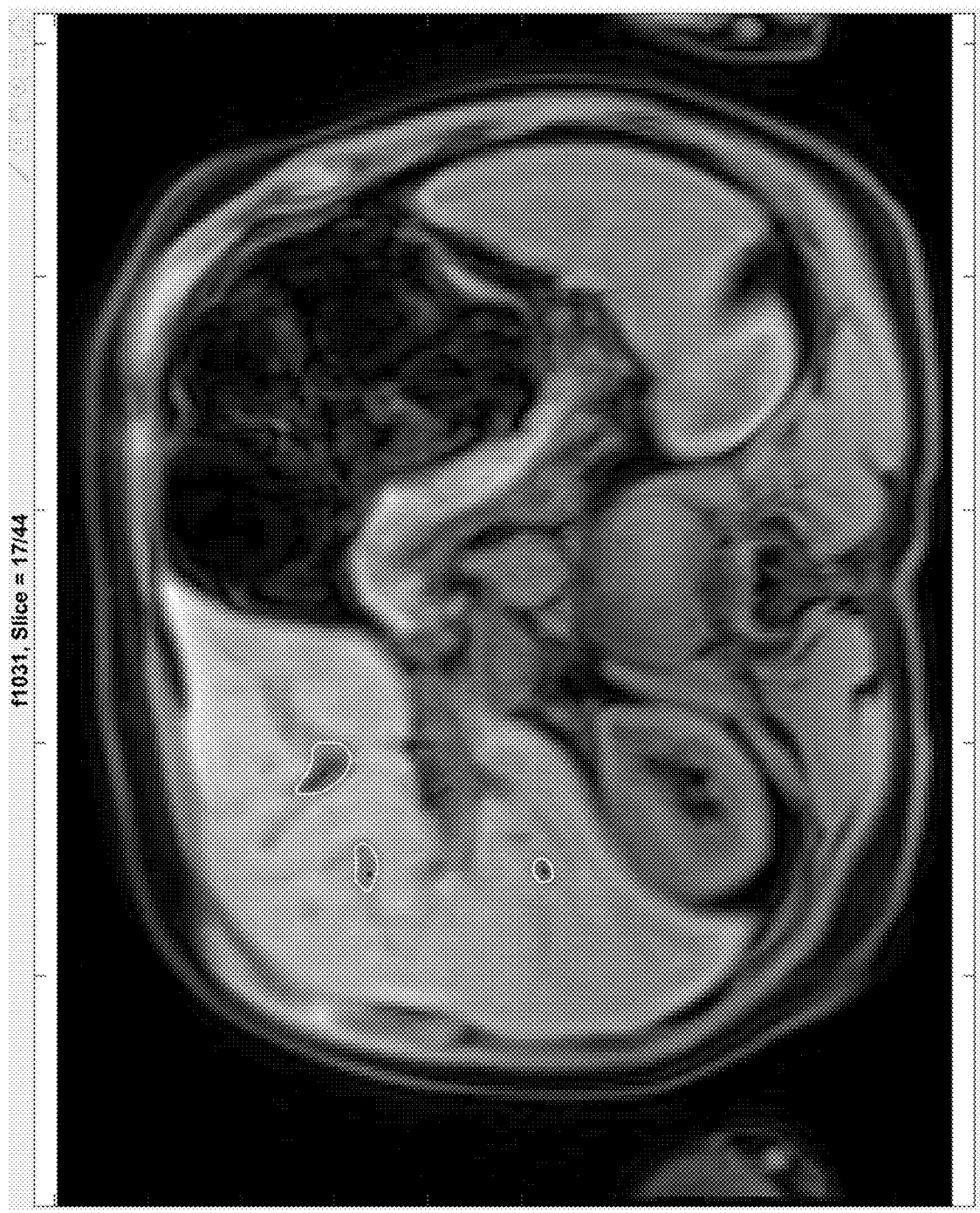
FIG. 3C is an image of a slice of a medical imaging scan, according to an embodiment of the present invention.
Figure 3D:
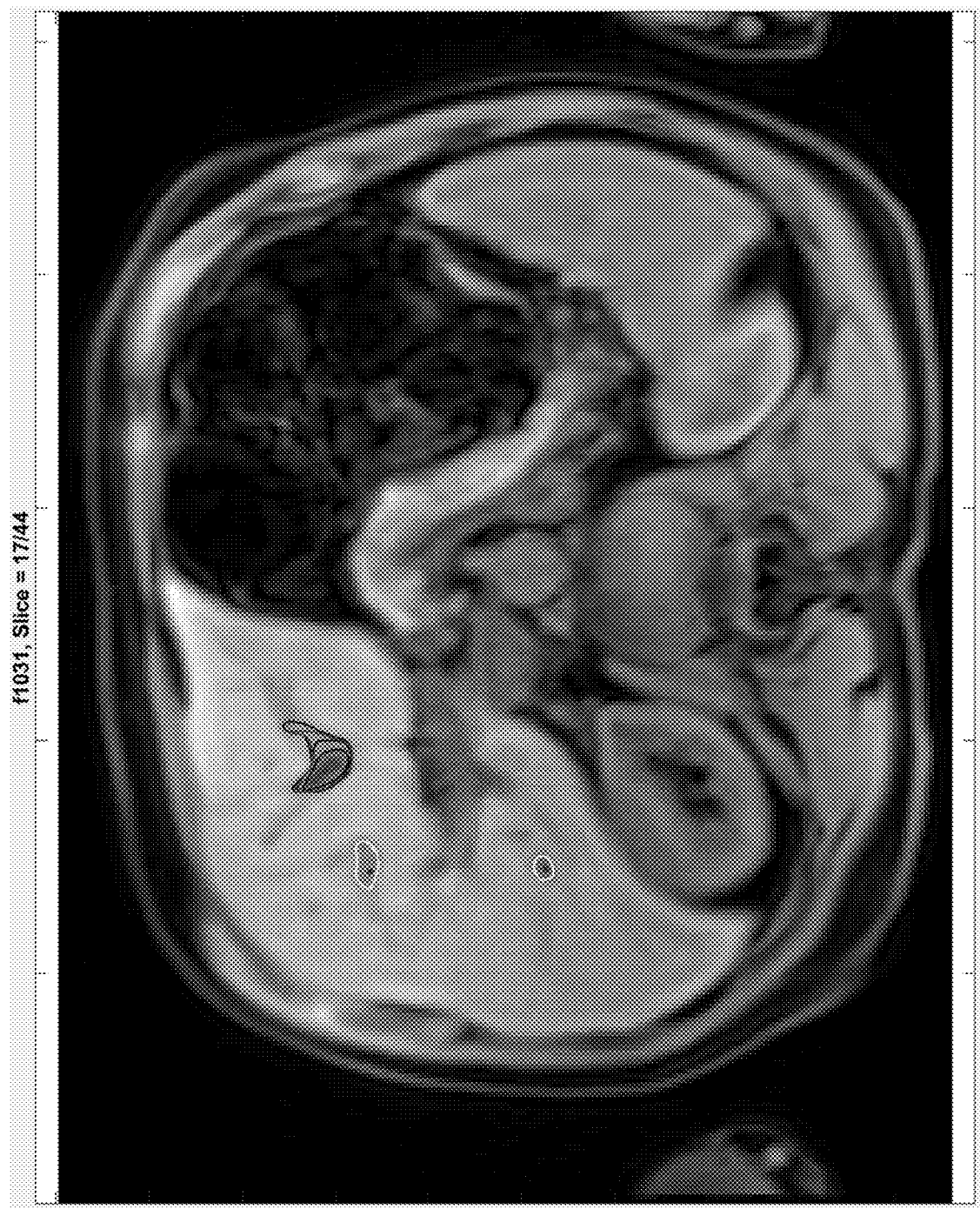
FIG. 3D is an image of a slice of a medical imaging scan, according to an embodiment of the present invention.
Figure 3E:
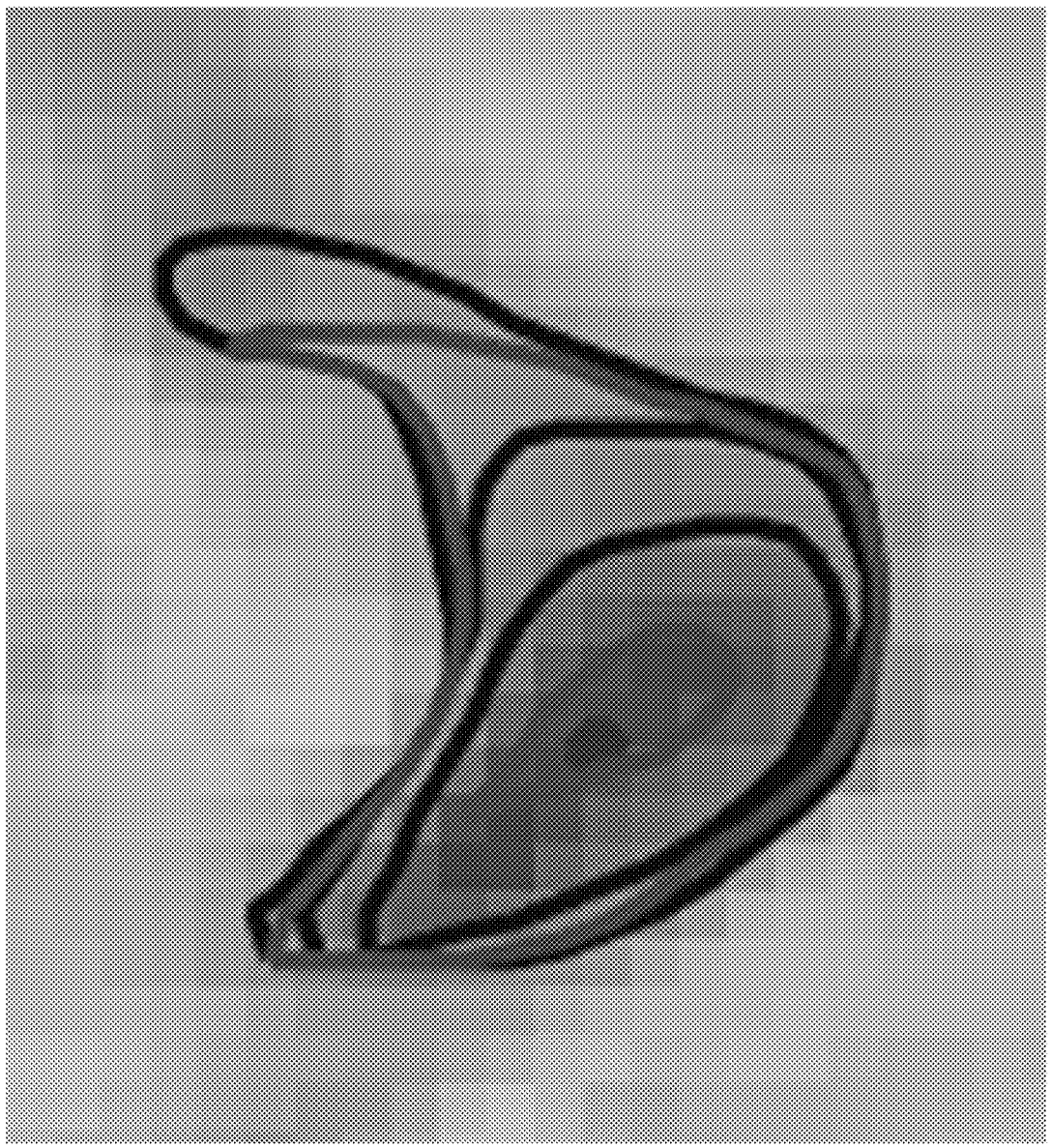
FIG. 3E is an enlarged view of a portion of FIG. 3D.

On lines 125-130 of Listing 1, the relevant characteristics (or "info") of the selected contour are saved into the array element contr(ii). Lines 81-130 of Listing 1 correspond to act 225 of FIG. 2, and lines 110, 111, and 70-75 of Listing 1 correspond to act 230 of FIG. 2. FIG. 3B shows a contour corresponding to the target point illustrated in FIG. 2A, and FIG. 3C shows contours for other target points (each corresponding to a different iteration of the loop extending from line 52 to line 169 of Listing 1). Each of FIGS. 3D and 3E shows a plurality of contours each corresponding to the target point illustrated in FIG. 2A, and each corresponding to a different iteration of the loop extending from line 66 to line 134 of Listing 1.

Lines 139-165 of Listing 1 are a loop (corresponding to act 235 of FIG. 2) that allows the operator (e.g., the radiologist) to select a preferred contour from among the plurality of contours, each generated by one iteration of the loop extending from line 66 to line 134 of Listing 1. The code at lines 141-144 of Listing 1 cause the contour with the next higher value of the index iplot to be drawn (in blue) when the up arrow key is pressed, and the code at lines 145-148 of Listing 1 cause the contour with the next lower value of the index iplot to be drawn (in magenta) when the down arrow key is pressed. When the right arrow key is pressed, the code at lines 149-163 of Listing 1 saves the parameters of the selected contour to voxel(count), where the variable named "count" is the index of the loop extending from line 52 to line 169 of Listing 1.

Figure 3F:
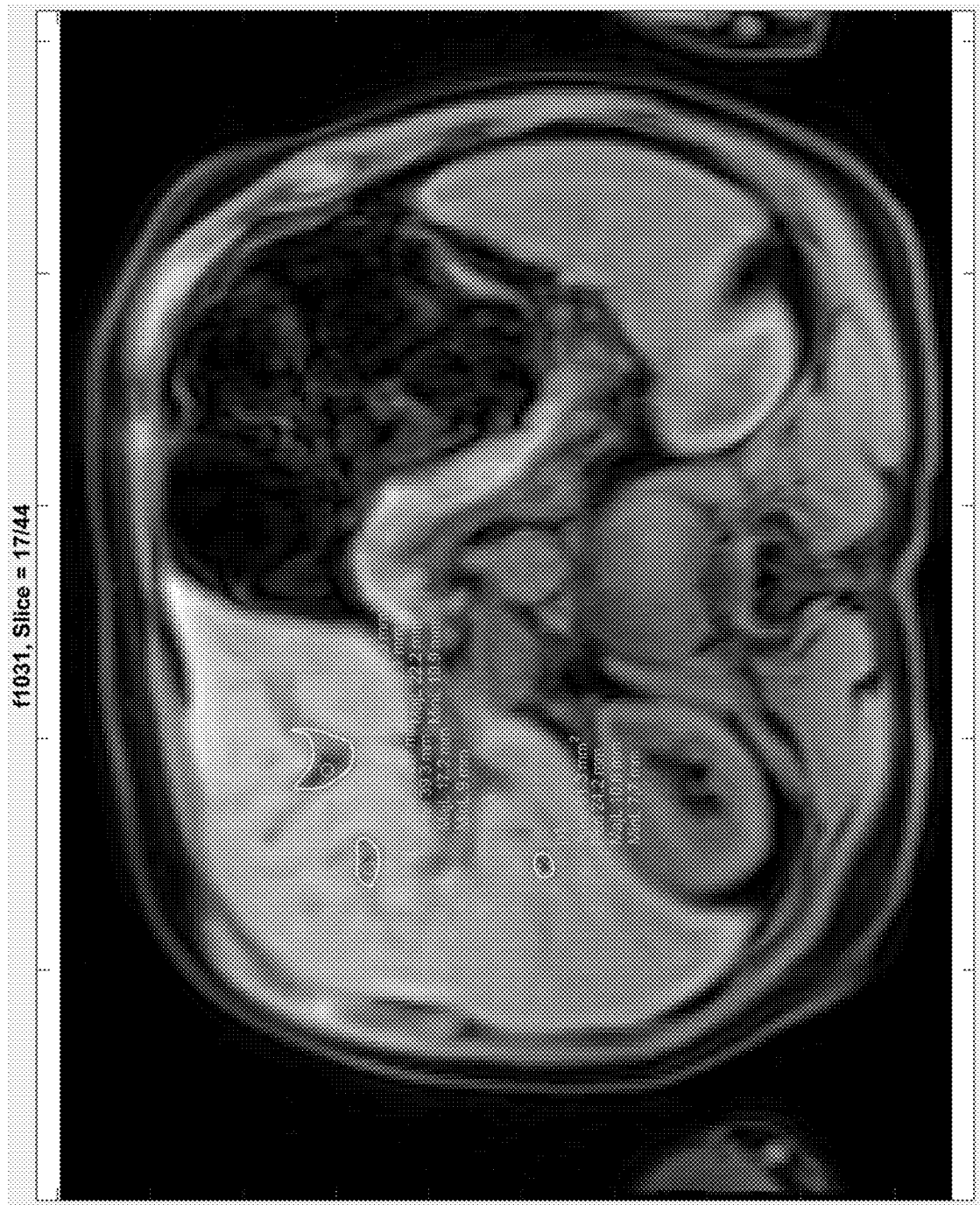
FIG. 3F is an image of a slice of a medical imaging scan, according to an embodiment of the present invention.

The reference slice is displayed at line 173 of Listing 1, and the selected contour is drawn on the displayed image at line 208 of Listing 1, for each of the target points (which are iterated over by the loop extending from line 188 to line 230 of Listing 1. Characteristics of each contour (or of the area enclosed by the contour) are calculated at lines 203-206 of Listing 1, and printed on the image at lines 213-233 (FIG. 3F shows an example of such an image). The characteristics may be calculated with dimensions of mm or mm^2 if scaling information is present in the data file (as determined on lines 176-183 of Listing 1), or in dimensionless units of pixels otherwise.

Lines 240-269 of Listing 1 are a loop iterating over a range of slices including the reference slice (in Listing 1, the range consists of 31 slices centered on the reference slice). The variable ii is a secondary loop index that starts (at line 239 of Listing 1) at 1 and is incremented by one at the end of each iteration of this loop.

Figure 3G:
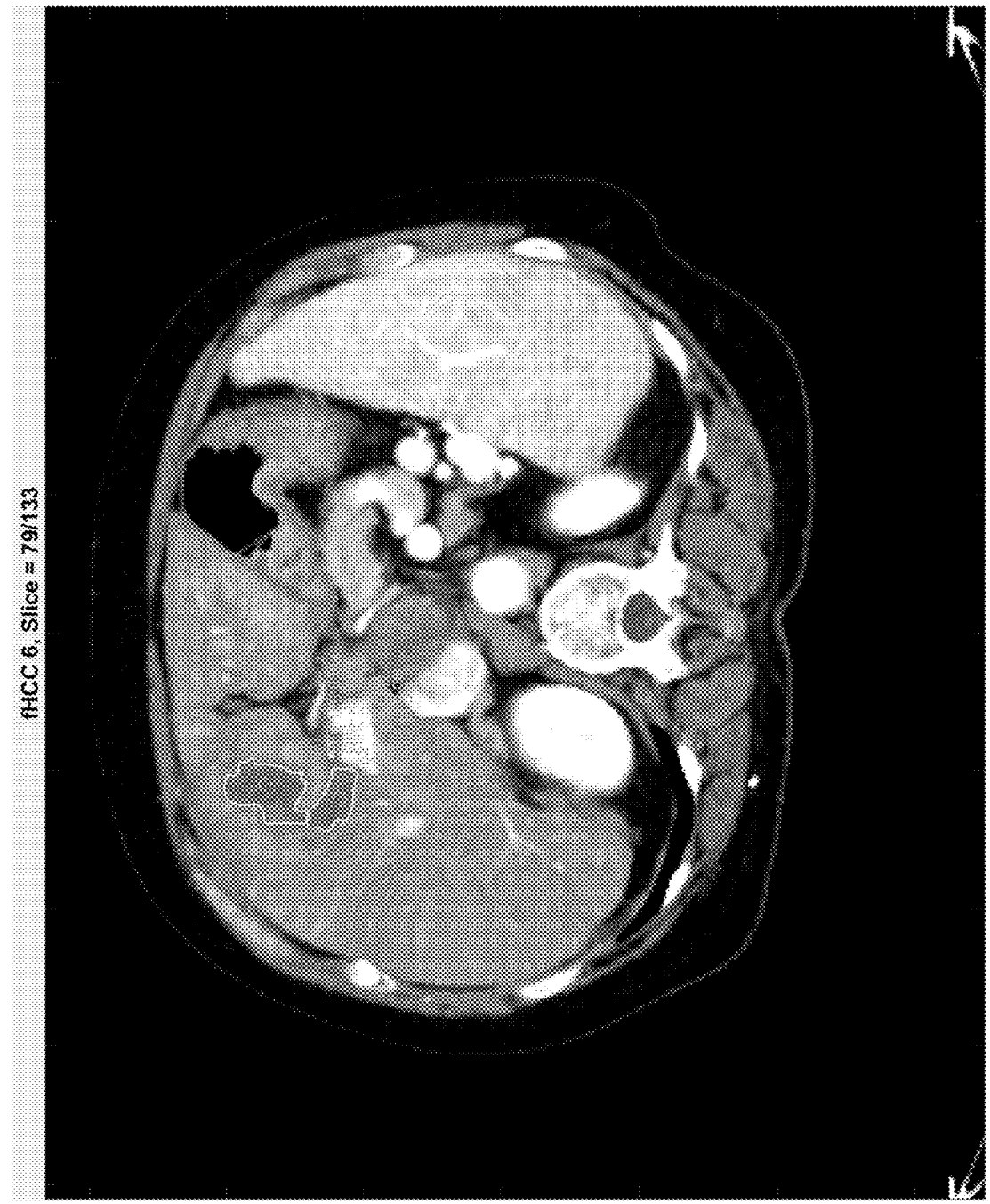
FIG. 3G is an image of a slice of a medical imaging scan, according to an embodiment of the present invention.
Figure 4:
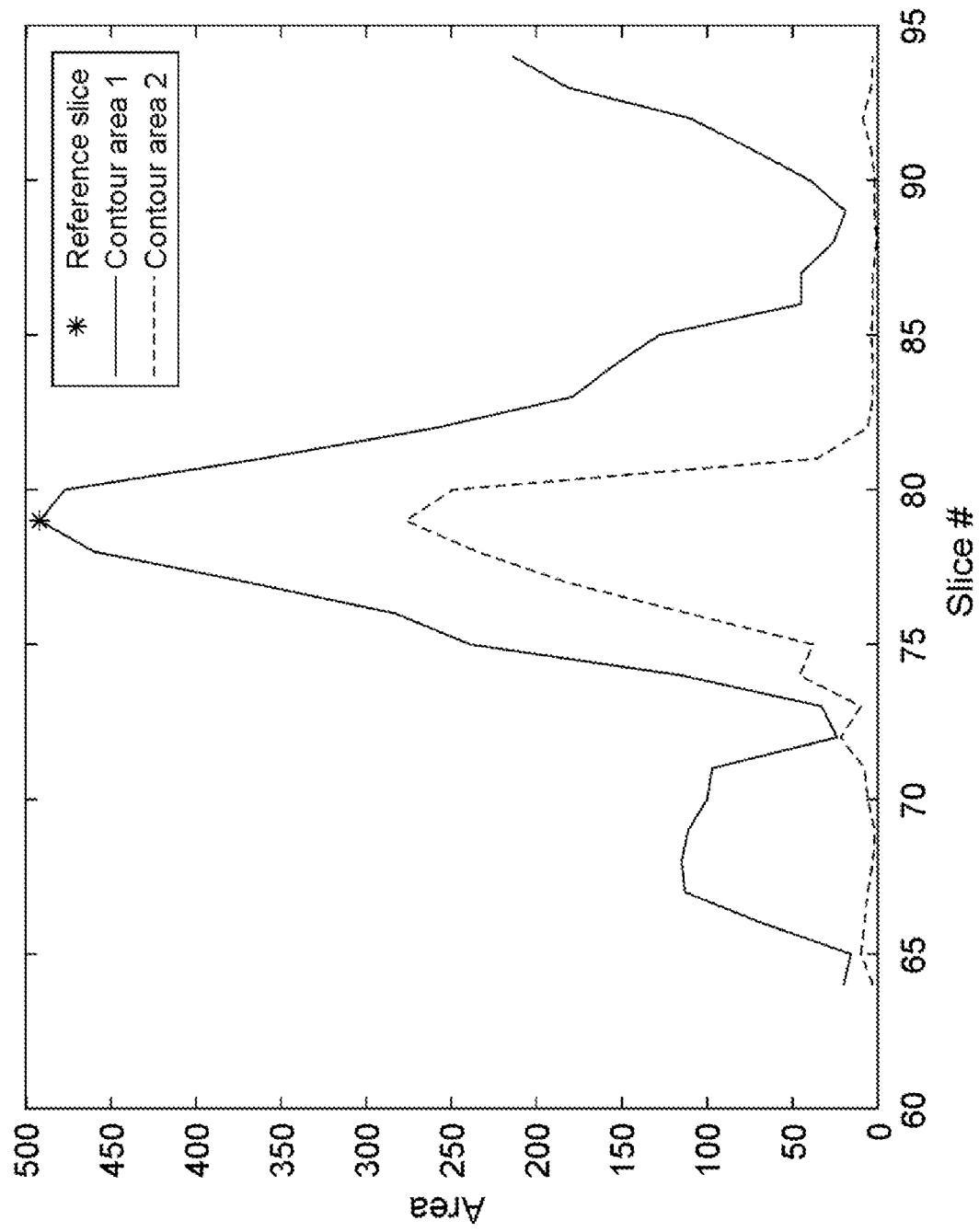
FIG. 4 is a graph based on a medical imaging scan, according to an embodiment of the present invention.

Lines 245-267 of Listing 1 are an inner loop that, for each of the selected contours, calculates the area (and other characteristics, e.g., on lines 259-261 of Listing 1, that are not used in the code of Listing 1 but that may be printed on the image, or otherwise used, in other embodiments). The variable areaArr (assigned on line 262 of Listing 1) is a two dimensional array of region arrays (one dimension being indexed by the slice index ii, and the other being indexed by the target point index (the variable named "count"). The area may then be graphed (or "plotted") (on lines 275-295 of Listing 1) as a function of slice index on a graph having one curve for each of the target points, and with an asterisk (produced by line 273 of Listing 1) showing the area of the reference slice. FIG. 4 is an example of such a graph for a scan data array for which FIG. 3G is an image of the reference slice.

Listing 1

```
1   clear all
2   %% Load in file of interest
3   MRIdata= 1; % MRI or CT data
4
5   if MRIdata
        fileName = 'C:\data\Work\Apollo_MDA\2019\data\data20190722\1031_MRI_WO.mat';%
6   44slices of 256x192%%%-->slice 17 (pancreas)
7       load (fileName);
8       dataIM= MRI; % MRI
9       slice =17;% 17
10      fileNameNum = char(fileName(end-14:end-11));
11  else %CT
        %fileName = 'C:\data\Work\Apollo_MDA\sharedDrive\mda_raw_data\Other_Cancer_Start_Data\Hepatocellular
12  Carcinoma (HCC)\Patient 6\6_imgset1.mat';% Xslices of AxB %%%-->79 & 108
        fileName = 'C:\data\Work\Apollo_MDA\sharedDrive\mda_raw_data\Other_Cancer_Start_Data\Hepatocellular
13  Carcinoma (HCC)\Patient 3\3_imgset1.mat';% Xslices of AxB %%%-->55 & 61
        %fileName = 'C:\data\Work\Apollo_MDA\sharedDrive\mda_raw_data\Other_Cancer_Start_Data\Hepatocellular
14  Carcinoma (HCC)\Patient 4\4_imgset1.mat';% Xslices of AxB %%%-->64 & 69
15
16      load (fileName);
17      dataIM = single(imgset1(2).image);
18      slice =61; % hcc6 79(2 blobs) & 108 (1 at edge); hcc3 55 (left) &61(top middle)
19      dataIM=min(1200,dataIM);
20      dataIM=max(900,dataIM);
21      fileNameNum = char([fileName(end-27:end-25) fileName(end-15:end-14)]);
22  end
23
24  [row, col,numSlice]=size(dataIM); %xx=col;yy=row;
25  maskIM= zeros(row,col,numSlice);
26
27  disp(['file name:' fileNameNum]);
28  f=squeeze(dataIM(:,:,slice));
29  maxVal= max(dataIM,[ ],'all');
30  f2= f/maxVal; % normalize
31  imagesc(f2),title(['f',fileNameNum,', Slice =', num2str(slice),'/', num2str(numSlice)]);
32  colormap gray;axis equal;colorbar;
33  set(gcf,'Position',get(0,'Screensize')); %set figures to full screen
34      numberLabel = 5; % max number voxel to be label
35      maxNumContourPlot =10; % number of contour expand/contracts
36
```

-continued

Listing 1

```
37      fac=row/256;
38      xySpan = round(2*fac); % span on each side {1}
39      xySS = 3; % start span search on each side {4}
40      xySSmax=10;
41
42
43      contourIncStart= 3; % start out contour area mean est block (for det thrh)
44      detThrsFac = 1; % fact to adj detection threshold
45
46  %%% start tool
47  % Initialize
48  count=1; % initialize 1st num of interest contour
49  maskValid = imbinarize(f2); % find valid cells (not include black region as cancer/cyst)
50                              % exclude outside body & other dark\black regions
51  hold on
52  while count <= numberLabel %
53      %%% point to voxel of interest
54      [x,y] = ginput(1);
55      if isempty(x) || x<0 || y<0
56          break; exit loop of marking voxel
57      end
58      % Put a cross over the point.
59      plot(x, y, 'rx', 'MarkerSize', 3, 'LineWidth', 2);
60      x0 = round(x);y0 = round(y);
61
62      %%% Plot contour section set
63      fig = gcf;
64      xMin=x0; xMax=x0; yMin=y0;yMax=y0; % initialize point ref for expand
65      iplot=contourIncStart; % reference contour select
66      for ii=1:maxNumContourPlot % number of steps or area increments
67          xySSearch=min(xySSmax,xySS+ii);
68          xySideSearch=round(xySSearch*fac); % span search on each side
69          % Increment the boundary after the 1st inital boundary
70          xIdx = max(1,xMin- xySpan): min(col,xMax+xySpan);
71          yIdx = max(1,yMin- xySpan): min(row,yMax+xySpan);
72
73          temp=f2(yIdx,xIdx).*maskValid(yIdx,xIdx);
74          meanV= mean(temp(temp>0),'all'); % find the mean of all valid cells
75          detThrs = detThrsFac*meanV; % change threshold function of new area
76
77          xIdxSearch = max(1,min(xMin-xySpan,x0-xySideSearch)): ... % expand search area
78                      min(col,max(xMax+xySpan,x0+xySideSearch));
79          yIdxSearch = max(1,min(yMin-xySpan,y0-xySideSearch)): ...
80                      min(row,max(yMax+xySpan,y0+xySideSearch));
81          f3 = (f2<=detThrs);% threshold binary mask
82          f4 = f2.*f3;% image after threshold mask
83          mask0 = zeros(size(f2)); % initialize
84
85          mask0(yIdxSearch,xIdxSearch) = 1;% make mask around area of mark point
86          f5=mask0.*f4;% image after mask of mark point(section below threshold & in the search area)
87                      % intersect of search area & detection area
88          f6=f5.*maskValid;% avoid including the outside (black)region
89
90          B = bwboundaries(f6); % binary of mask
91
92
93          xMin = col;xMax=1;% initialize
94          yMin = row;yMax=1;% initialize
95
96          numBlobs = length(B);
97          areaBlobMax = 0;
98          areaBlob= zeros(1,numBlobs);
99          for k=1:numBlobs % go thru all "blob"
100             bound = B{k};
101             x1=bound(:,2);y1=bound(:,1);
102             areaBlob(k) = polyarea(x1, y1);
             if areaBlob(k)>areaBlobMax && inpolygon(x0,y0,x1,y1)% max area that also include
103 selected pt
                 areaBlobMax = areaBlob(k);
105              kSelect=k;x2=x1;y2=y1;
106         end
107
108         %plot(x1,y1,'y','LineWidth',1); % plot each blobs
109         % find the (rectangular)outer bound of all detection "blobs"
110         xMin=min(xMin,min(x1));xMax=max(xMax,max(x1));
111         yMin=min(yMin,min(y1));yMax=max(yMax,max(y1));
112     end
```

-continued

Listing 1

```
113            if ~exist('x2','var') % if odd case not find, select boundary with max area
114                if max(areaBlob)>0
115                    Imax = find(areaBlob==max(areaBlob));
116                else
117                    Imax =1;
118                end
119                kSelect=Imax; bound = B{kSelect};x2=bound(:,2);y2=bound(:,1);
120                xMin=min(x2);xMax=max(x2);yMin=min(y2);yMax=max(y2);
121            end
122
123            %plot(x4corner,y4corner,'g--','LineWidth',0.6);
124            % save off the contour info for each voxel
125            contr(ii).x = x2;
126            contr(ii).y = y2;
127            contr(ii).f = f6;
128            contr(ii).k = kSelect;
129            contr(ii).thrs = detThrs;
130            contr(ii).mask0 = mask0;
131
132            clearvars x2 y2 kSelect % clear variables
133            %plot(contr(ii).x,contr(ii).y,'y','LineWidth',1); % plot all contours for debug
134        end
135
136        plot(smooth(contr(iplot).x),smooth(contr(iplot).y),'y','LineWidth',1); % first initial contour plot
137
138        %% label point target & change contour size as operator arrow respond
139        for jj=1:20% number of time to inquire user
140            was_a_key = waitforbuttonpress;
141            if was_a_key && strcmp(get(fig, 'CurrentKey'), 'uparrow') % bigger contour
142                iplot =min(maxNumContourPlot,iplot+1);
143
144                plot(smooth(contr(iplot).x),smooth(contr(iplot).y),'b','LineWidth',1);
145            elseif was_a_key && strcmp(get(fig, 'CurrentKey'), 'downarrow') % smaller contour
146                iplot =max(1 ,iplot-1);
147
148                plot(smooth(contr(iplot).x),smooth(contr(iplot).y),'m','LineWidth',1);
149            elseif was_a_key && strcmp(get(fig, 'CurrentKey'), 'rightarrow') % exit & save data
150                voxel(count).xIdx = contr(iplot).x;
151                voxel(count).yIdx = contr(iplot).y;
152                voxel(count).img = contr(iplot).f;
153                voxel(count).k = contr(iplot).k;
154                voxel(count).thrs = contr(iplot).thrs;% saved thrshold for each selected contour
155                voxel(count).mask0 = contr(iplot).mask0;% saved search area for " "
156                voxel(count).x0 = x0;
157                voxel(count).y0 = y0;
158                prompt= 'Please Input Comment ';% Notation area
159                comment=input(prompt,'s');
160                voxel(count).comment =comment;
161                Nvoxel =count; % number of contours operator select
162                break % exit loop of increase/decrease size of voxel
163            else
164            end
165        end
166
167        % Increment the count.
168        count = count + 1;% voxel marking count
169    end
170    hold off
171
172    %% Make final plot & label & provide stat
173    figure; imagesc(f2),title(['f',fileNameNum,', Slice = ', num2str(slice),'/', num2str(numSlice)]);
174    colormap gray;axis equal;colorbar;
175
176    if exist('info','var') % ck to see pixel spacing info available
177        noPixelSpacInfo=0;
178        pXY=info.PixelSpacing;
179    else
180        noPixelSpacInfo=1;
181        disp('no pixel spacing info');
182        pXY=1;
183    end
184    spac =pXY(1);% spacing in xy plane (in mm)
185    idel = 1;% spacing of text message next to blob
186    ySpc = 4;
187    hold on
188    for jj=1: length (voxel) % extract save data for each selected contour
189        xx = voxel(jj).xIdx;
```

-continued

Listing 1

```
190        yy = voxel(jj).yIdx;
191        x0 = voxel(jj).x0;
192        y0 = voxel(jj).y0;
193        comment = voxel(jj).comment;
194        ff = voxel(jj).img;
195        kk = voxel(jj).k;
196
197        %perf image stat
198        BW= imbinarize(ff);
199        stats = regionprops('table',BW,'Centroid','PixelList','Area',...
200               'Perimeter','Eccentricity','Solidity','Extent','FilledArea',...
201               'MajorAxisLength','MinorAxisLength');
202
203        maxArea= stats.Area(kk)*spac^2;
204        Perimeter =stats.Perimeter(kk)*spac;
205        MajorAxisLength =stats.MajorAxisLength(kk)*spac;
206        MinorAxisLength =stats.MinorAxisLength(kk)*spac;
207
208        plot(smooth(xx),smooth(yy),'y','LineWidth',0.9);
209        plot(x0, y0, 'co');% reference user pint index
210        plot(stats.Centroid(kk,1),stats.Centroid(kk,2),'rx');% centroid of contour
211        xMax = max(xx);yMax = max(yy);yMin = min(yy);
212        x3= xMax+idel;y3=yMin+idel;
213        if noPixelSpacInfo==1
214            str1= ['Area ',num2str(round(maxArea,1)),' pix^2'];
215            str2= ['Peri ',num2str(round(Perimeter,1)),' pix'];
216            str3= ['MajL ' ,num2str(round(MajorAxisLength,1)),' pix'];
217            str4= ['MinL ' ,num2str(round(MinorAxisLength,1)),' pix'];
218        else
219            str1= ['Area ',num2str(round(maxArea,1)),' mm^2'];
220            str2= ['Peri ',num2str(round(Perimeter,1)),' mm'];
221            str3= ['MajL ' ,num2str(round(MajorAxisLength,1)),' mm'];
222            str4= ['MinL ' ,num2str(round(MinorAxisLength,1)),' mm'];
223        end
224
225        text(x3,y3,comment,'color','green','fontSize',8);
226        text(x3,y3+1*ySpc,str1,'color','green','fontSize',8);
227        text(x3,y3+2*ySpc,str2,'color','green','fontSize',8);
228        text(x3,y3+3*ySpc,str3,'color','green','fontSize',8);
229        text(x3,y3+4*ySpc,str4,'color','green','fontSize',8);
230    end
231    hold off
232
233    %% 3D, for other slices in the same patient
234    figure;
235    nSS = 15; % nunber of slices inspect on each side of the selected key slice
236    sArr = max(1,slice-nSS):min(numSlice,slice+nSS);
237
238    areaArr = zeros(length(sArr), Nvoxel);
239    ii=1;
240    for sl=sArr
241        f=squeeze(datalM(:,:,sl)); % step thru each slice of interest
242        f2= f/maxVal;
           imagesc(f2),title(['f',fileNameNum,', Slice = ', num2str(sl),'/', num2str(numSlice)]);colormap
243    gray;axis equal;colorbar;
244
245        for count=1:Nvoxel
246            detThrs = voxel(count).thrs; % extract the saved thrshold for each selected contour
247            mask0 = voxel(count).mask0; % extract the saved search area for " " "
248            f3 = (f2<=detThrs);% threshold binary mask
249            f4 = f2.*f3;% image after threshold mask
250            f5 = mask0.*f4;% image after mask of mark point
251            BW = imbinarize(f5);
252            if max(BW,[ ],'all')>0
253                stats = regionprops('table',BW,'Centroid','PixelList','Area',...
254                       'Perimeter','Eccentricity','Solidity','Extent','FilledArea',...
255                       'MajorAxisLength','MinorAxisLength');
256                [numBlobs,~] = size(stats);
257                [kk,~] = find(stats.Area==max(stats.Area),1);
258                maxArea= stats.Area(kk)*spac^2;
259                Perimeter =stats.Perimeter(kk)*spac;
260                MajorAxisLength =stats.MajorAxisLength(kk)*spac;
261                MinorAxisLength =stats.MinorAxisLength(kk)*spac;
262                areaArr(ii,count) = maxArea;
263                %disp([' slice ',num2str(sl),', voxel ',num2str(count),', area = ',num2str(maxArea)]);
```

Listing 1

```
264          else
265              areaArr(ii,count) = 0;
266          end
267      end
268      ii=ii+1;
269  end
270  disp('Slice Voxel_1 Voxel_2 ...')
271  disp([round(sArr,0)' round(areaArr,2)]);
272  % plot area multi slices for all selected voxels
273  plot(slice,areaArr(slice-(sArr(1)-1),1),'k*')
274  hold on;
275  if Nvoxel==1
276      plot(sArr, areaArr,'b')
277      legend('Reference slice','Contour area','Location','NorthEast')
278  elseif Nvoxel==2
279      plot(sArr,areaArr(:,1),'b',sArr,areaArr(:,2),'r--');
280      legend('Reference slice','Contour area 1','Contour area 2','Location','NorthEast')
281  elseif Nvoxel==3
282      plot(sArr,areaArr(:,1),'b',sArr,areaArr(:,2),'r--', sArr,areaArr(:,3),'g')
283      legend('Reference slice','Contour area 1','Contour area 2','Contour area 3',...
284          'Location','NorthEast')
285  elseif Nvoxel==4
286      plot(sArr,areaArr(:,1),'b',sArr,areaArr(:,2),'r--', sArr,areaArr(:,3),'g'...
287          ,sArr,areaArr(:,4),'m')
288      legend('Reference slice','Contour area 1','Contour area 2','Contour area 3',...
289          'Contour area 4','Location','NorthEast')
290  elseif Nvoxel==5
291      plot(sArr,areaArr(:,1),'b',sArr,areaArr(:,2),'r--', sArr,areaArr(:,3),'g'...
292          ,sArr,areaArr(:,4),'m--',sArr,areaArr(:,5),'c')
293      legend('Reference slice','Contour area 1','Contour area 2','Contour area 3',...
294          'Contour area 4','Contour area 5','Location','NorthEast')
295  end
296  hold off
297  grid on;
298  xlabel(' Slice #');
299  ylabel(' Area');
```

As used herein, the word "or" is inclusive, so that, for example, "A or B" means any one of (i) A, (ii) B, and (iii) A and B. As used herein, the term "array" refers to an ordered set of numbers regardless of how stored (e.g., whether stored in consecutive memory locations, or in a linked list). As used herein, a "rectangle" is a parallelogram having right angles at all of its vertices, and the term "rectangle" does not exclude a rectangle in which the lengths of all four sides are the same (i.e., a square). As such, a "square" is a special case of a rectangle. As used herein, a first rectangle may be said to "contain" a second rectangle when no part of the second rectangle is outside of the first rectangle. As such, when a first rectangle is identical to a second rectangle, and the first rectangle is in the same position as the second rectangle, the first rectangle contains the second rectangle and the second rectangle contains the first rectangle. As used herein, when one quantity (e.g., a first array) is referred to as being "based on" another quantity (e.g., a second array) it means that the second quantity influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory) as the second quantity.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

Although limited embodiments of a system and method for generating contours in medical imaging scans have been specifically described and illustrated herein, many modifications and variations will be apparent to those skilled in the art. Accordingly, it is to be understood that a system and method for generating contours in medical imaging scans employed according to principles of this invention may be embodied other than as specifically described herein. The invention is also defined in the following claims, and equivalents thereof.

What is claimed is:

1. A method for generating contours, comprising:
    forming a global mask from a first target point in a normalized scan data array by setting to 1 each element of the global mask corresponding to an element of the normalized scan data array exceeding a global mask threshold, and setting to 0 each element of the global mask corresponding to an element of the normalized scan data array not exceeding the global mask threshold;

calculating a first threshold, based on the first target point in the normalized scan data array and the global mask;

generating a first contour, the first contour being a boundary of a first region, the first region being a region within which the elements of the normalized scan data array are less than the first threshold;

utilizing the first contour to determine a second region;

calculating a second threshold in the second region;

generating a second contour from the second threshold; and selecting the first or second contour to define an area of interest in the normalized scan data array.

2. The method of claim 1, wherein the calculating of the first threshold comprises calculating a statistic of a first portion of the normalized scan data array, the first portion being within a first threshold-finding rectangle.

3. The method of claim 2, wherein the statistic of the first portion of the normalized scan data array is the mean of the first portion of the normalized scan data array.

4. The method of claim 1, further comprising generating the global mask threshold, based on the normalized scan data array, using Otsu's algorithm.

5. The method of claim 1, wherein the first region further is a region within a first search area, the first search area being a first rectangle.

6. The method of claim 5, wherein the first region is the largest region of one or more regions within which the elements of the normalized scan data array are less than the first threshold.

7. The method of claim 1, wherein the second threshold is greater than the first threshold; and the second region is a region within which the elements of the normalized scan data array are less than the second threshold.

8. The method of claim 1, wherein the calculating of the second threshold comprises calculating a statistic of a second portion of the normalized scan data array, the second portion being within a second threshold-finding rectangle and within the global mask.

9. The method of claim 8, wherein the statistic of the second portion of the normalized scan data array is the mean of the second portion of the normalized scan data array.

10. The method of claim 8, wherein the second threshold-finding rectangle is at least as large as a smallest rectangle including the one or more regions within which the elements of the normalized scan data array are less than the first threshold.

11. The method of claim 10, wherein:

the second region further is a region within a second search area, the second search area is a second rectangle, and the second rectangle contains the second threshold-finding rectangle.

12. The method of claim 11, wherein the second region is the largest region of one or more regions within which the elements of the normalized scan data array are less than the second threshold.

13. A system for generating contours comprising:

a processing circuit, and a non-transitory memory, the non-transitory memory storing instructions that, when executed by the processing circuit, cause the processing circuit to:

form a global mask from a first target point in a normalized scan data array by setting to 1 each element of the global mask corresponding to an element of the normalized scan data array exceeding a global mask threshold, and setting to 0 each element of the global mask corresponding to an element of the normalized scan data array not exceeding the global mask threshold;

calculate a first threshold, based on the first target point in the normalized scan data array and the global mask;

generate a first contour, the first contour being a boundary of a first region, the first region being a region within which the elements of the normalized scan data array are less than the first threshold;

utilize the first contour to determine a second region;

calculate a second threshold in the second region;

generate a second contour from the second threshold; and select the first or second contour to define an area of interest in the normalized scan data array.

14. The system of claim 13, wherein calculating of the first threshold comprises calculating a statistic of a first portion of the normalized scan data array, the first portion being within a first threshold-finding rectangle.

15. The system of claim 14, wherein the statistic of the first portion of the normalized scan data array is the mean of the first portion of the normalized scan data array.

16. The system of claim 13, wherein the instructions further cause the processing circuit to calculate the global mask threshold, based on the normalized scan data array, using Otsu's algorithm.

17. The system of claim 13, wherein the first region further is a region within a first search area, the first search area being a first rectangle.

18. The system of claim 17, wherein the first region is the largest region of one or more regions within which the elements of the normalized scan data array are less than the first threshold.

* * * * *